United States Patent
Kaplan et al.

(10) Patent No.: US 12,423,580 B1
(45) Date of Patent: Sep. 23, 2025

(54) CROSSBAR BASED TRANSPOSE DATA TRANSFERS

(71) Applicant: Amazon Technologies, Inc., Seattle, WA (US)

(72) Inventors: Patricio Kaplan, Palo Alto, CA (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 18/194,043

(22) Filed: Mar. 31, 2023

(51) Int. Cl.
*G06F 13/28* (2006.01)
*G06N 3/08* (2023.01)

(52) U.S. Cl.
CPC ............... *G06N 3/08* (2013.01); *G06F 13/28* (2013.01)

(58) Field of Classification Search
CPC .................................. G06F 13/28; G06N 3/08
USPC ........................................................ 710/22
See application file for complete search history.

(56) References Cited

U.S. PATENT DOCUMENTS

| | | | |
|---|---|---|---|
| 9,952,831 B1* | 4/2018 | Ross | G06F 7/78 |
| 10,817,260 B1 | 10/2020 | Huang et al. | |
| 11,494,326 B1 | 11/2022 | Xu et al. | |
| 2006/0294347 A1 | 12/2006 | Zou et al. | |
| 2008/0013119 A1* | 1/2008 | Case | G06K 15/10 358/3.06 |
| 2008/0219160 A1 | 9/2008 | Trinh et al. | |
| 2009/0161547 A1 | 6/2009 | Riddle et al. | |
| 2015/0106587 A1 | 4/2015 | Che et al. | |
| 2016/0224098 A1 | 8/2016 | Gendler et al. | |
| 2017/0235511 A1 | 8/2017 | Palmer et al. | |
| 2019/0042248 A1* | 2/2019 | Bradford | G06F 9/30109 |
| 2019/0340491 A1 | 11/2019 | Norden et al. | |
| 2020/0142806 A1 | 5/2020 | Zbiciak et al. | |
| 2020/0192968 A1* | 6/2020 | Prathapan | G06F 13/287 |
| 2020/0241844 A1* | 7/2020 | Koeplinger | G06F 5/08 |
| 2023/0017662 A1* | 1/2023 | Kadri | G06F 13/28 |
| 2023/0176981 A1* | 6/2023 | Wei | G06F 12/0207 711/165 |
| 2023/0229910 A1* | 7/2023 | Brady | G06N 3/048 706/22 |
| 2024/0134564 A1* | 4/2024 | Choi | G06F 3/0656 |
| 2024/0143525 A1* | 5/2024 | Chen | G06F 13/28 |
| 2024/0152471 A1* | 5/2024 | Liu | G06F 13/122 |

OTHER PUBLICATIONS

U.S. Appl. No. 18/194,034, inventors Kaplan P., et al., filed on Mar. 31, 2023.
U.S. Non-Final Office Action dated Nov. 8, 2024 in U.S. Appl. No. 18/194,034.
U.S. Final Office Action dated Mar. 24, 2025 in U.S. Appl. No. 18/194,034.

* cited by examiner

Primary Examiner — Christopher B Shin
(74) Attorney, Agent, or Firm — Weaver Austin Villeneuve & Sampson LLP

(57) ABSTRACT

Techniques to perform transpose operations in a crossbar circuit may include receiving a set of write transactions to write a data array to a target memory, and determining that the set of write transactions is for a transpose write. Write data for each of the write transactions can be stored diagonally in a transpose memory of the crossbar circuit. Each row of data in the transpose memory can be rotated, and rotated data from each row of the transpose memory can be provided to a corresponding output port of the crossbar circuit to write to the target memory.

20 Claims, 12 Drawing Sheets

| OPCODE 782 | WRITE DATA TO TRANSPOSE MEMORY 784 | DECREMENT CREDIT 786 |
|---|---|---|
| SPRAY | ✓ | ✗ |
| SPRAY-LAST | ✓ | ✓ |
| SPRAY-LAST-WITH-NOP | ✓ | ✓ |
| NOP | ✗ | ✓ |

FIG. 7C

ABSTRACT# CROSSBAR BASED TRANSPOSE DATA TRANSFERS

BACKGROUND

Machine learning utilizes neural network computational models to perform complex tasks such as image recognition, natural language processing, among others. A neural network can involve various computations such as matrix multiplication operations, activation operations, pooling operations, etc. Neural networks can be executed on specialized hardware accelerators having circuitry tailored to perform such neural network computations.

BRIEF DESCRIPTION OF THE DRAWINGS

Various embodiments in accordance with the present disclosure will be described with reference to the drawings, in which:

FIG. 7C illustrates a table listing some examples of opcodes;

DETAILED DESCRIPTION

Figure 1:
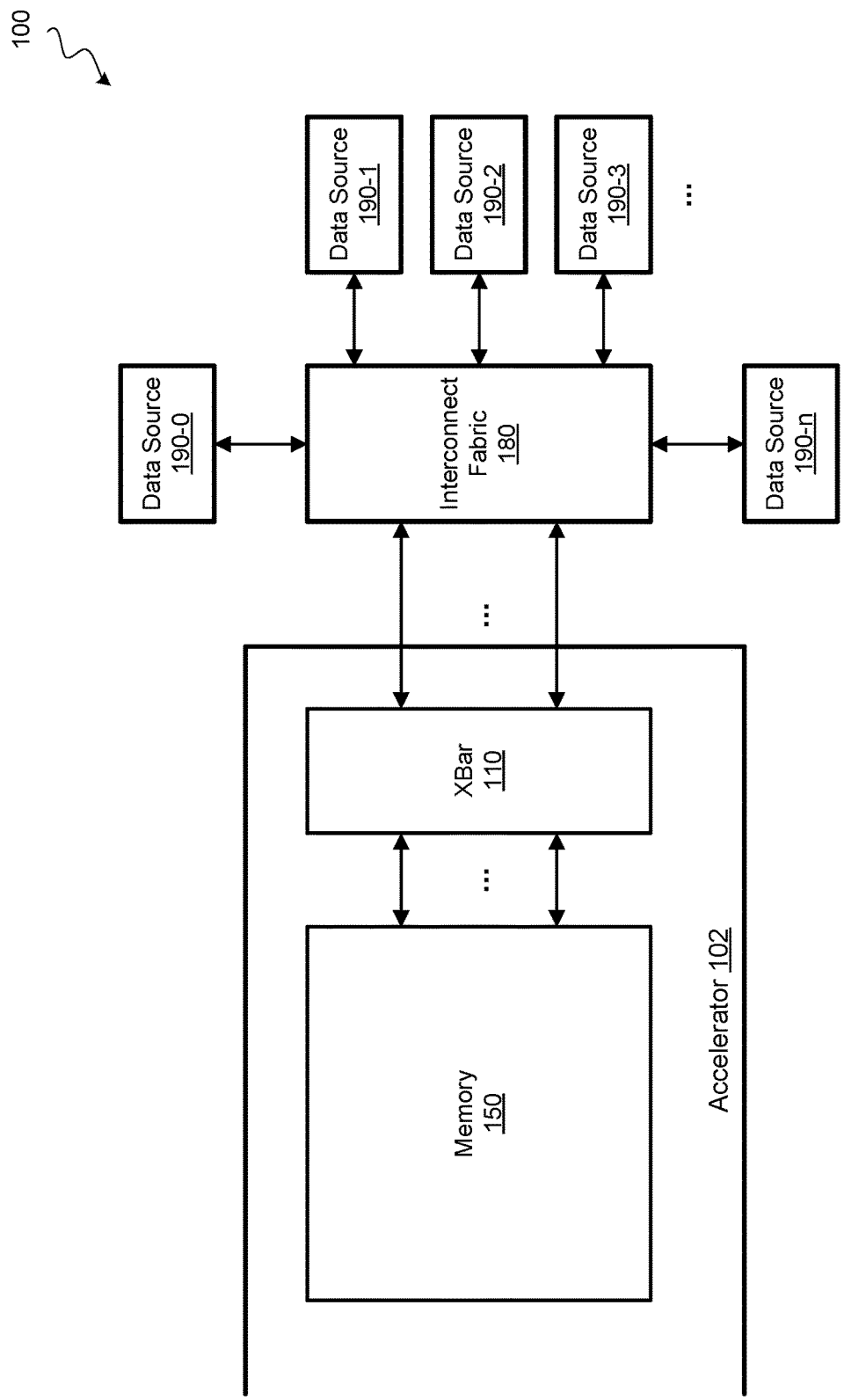
FIG. 1 illustrates a simplified block diagram of an example of an acceleration engine.

Machine learning workloads typically operate on large amounts of matrix computations. Some computations may involve transposing a matrix. Matrix transposition can also be used to resolve data layout conflicts between the way a tensor is stored and the layout format compatible with a compute engine operating on the tensor. One way to perform a transpose operation on a matrix is to read the data elements of the matrix, and write individual data elements to specific memory locations to reflect the transposed data layout. However, doing so may incur significant memory access latencies and increase execution time, because an individual transaction is performed for each data element.

By way of example, direct memory access (DMA) transactions can be used to transfer chunks of data. Assuming that a DMA transaction can carry up to 256 bytes of data, to transpose a 128×128 data array of 2-byte data elements (e.g., 16-bit floating point (FP16) or brain floating point (BF16) data elements), a single DMA transaction can read an entire row of the data array. However, to write the data elements into different rows of the same column of a target memory, 128 individual DMA transactions are required, with each DMA transaction writing one data element. Repeating this 128 times for each row of the data array can result in significant latencies. Moreover, to exacerbate the situation, each DMA transaction may use a memory descriptor, which can be, for example, 16 bytes long. Hence, it may take 16 bytes of overhead to write just 2 bytes of data for a single data element of the data array. Transposing the data array can incur substantial amount over overhead as compared to the amount of data being transferred.

To reduce the latency and overhead with transpose operations, the techniques disclosed herein utilize a crossbar to transpose a data array when writing the data array to a target memory. To provide transpose functionality, the crossbar can implement an internal transpose memory to rearrange a data array on-the-fly in the crossbar when writing the data array to the target memory. The crossbar may receive write transactions from one or more data sources such as DMA engines via the interconnect fabric. The write transaction can include an indication that these write transactions are part of a transpose operation. When the crossbar recognizes that the write transactions are for a transpose write, the write data of each write transaction can be stored diagonally in the transpose memory of the crossbar, and each row of data in the transpose memory can be rotated. The rotated data from each row of the transpose memory is provided to a corresponding output port of the crossbar to write to the target memory.

In some implementations, each output port of the crossbar may write to multiple row partitions of a row group in the target memory. As such, the row data provided from the transpose memory to the output port may also need to be reshaped for distribution to the multiple row partitions of the target memory. In such implementations, each output port of the crossbar can implement an output buffer. The row data provided from the transpose memory can be stored diagonally in the output buffer, and each row of the output buffer can be rotated before being written to a corresponding row partition of the target memory.

By utilizing a crossbar to perform the transpose operations on-the-fly, the data elements of the data array being transposed need not be split up into individual DMA write transactions. Instead, the crossbar can receive chunks of data from DMA transactions in parallel, transpose the data array on-the-fly in the crossbar, and write out the transposed data in parallel to the target memory. From the DMA engine's perspective, the data transfer for a transpose write can be performed in a similar manner as a normal write operation, and full data transfer bandwidth can be achieved by performing the transpose operations in the crossbar. It should also be noted that the crossbar can also be used to transpose data from other data sources that can issue write transactions.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a simplified block diagram of an example of an acceleration engine 100 (e.g., a neural network processor). Acceleration engine 100 may include an accelerator 102 that is coupled to multiple data sources 190-0 to 190-*n* via an interconnect fabric 180. Data sources 190-0 to 190-*n* may include DMA engines, other accelerators, processors, memory controllers, I/O controllers, etc., or other components that can provide data to accelerator 102. Some of the data sources 190-0 to 190-*n* can be coupled to external components such as external memory or I/O devices. Interconnect fabric 180 can provide interconnectivity and route communications between the components of acceleration engine 100. In some implementations, interconnect fabric 180 can be, for example, an Advanced extensible Interface (AXI) interconnect fabric, or other suitable interconnect fabrics.

Accelerator 102 may include a crossbar 110 (abbreviated as "xbar") and a memory 150. Accelerator 102 may include other components not specifically shown. For example, accelerator 102 may include a processing engine (PE) array that is tailored for performing matrix multiplication operations. The PE array may load data from memory 150, perform computations on the data, and write back the results to memory 150. In some implementations, the results can be intermediate results that are loaded back into the PE array for further computations. Memory 150 may also be referred to as a state buffer memory. Accelerator 102 may also include other compute engines not specifically shown that can load data from memory 150 and write back computational results to memory 150. For example, accelerator 102 may include an activation engine, a pooling engine, and a vector compute engine.

Crossbar 110 is an integrated circuit that may include multiple input and output ports, and can transfer data from an input port to any output port. Crossbar 110 can be coupled to interconnect fabric 180 on multiple ports, and similarly be coupled to memory 150 on multiple ports. Crossbar 110 can process data transfers occurring on different ports in parallel. For example, crossbar 110 may receive multiple write transactions from interconnect fabric 180, and write multiple chunks of data into memory 150 in parallel. Crossbar 110 may include an internal memory to temporarily store data being transferred between memory 150 and interconnect fabric 180. Each output port of crossbar 110 may also include an output buffer to buffer data being written to memory 150.

Figure 2:
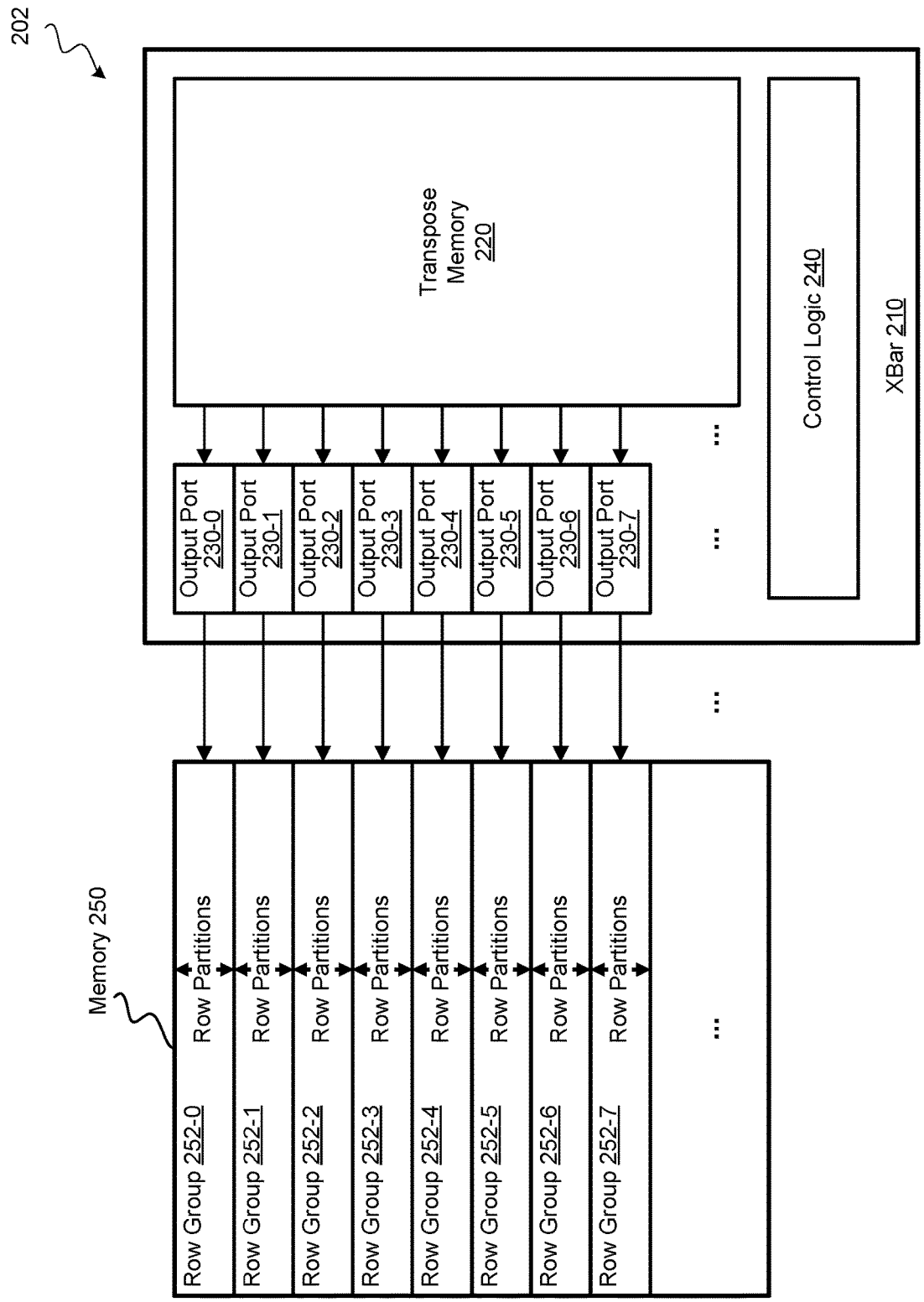
FIG. 2 illustrates a simplified block diagram of an example of an accelerator.

FIG. 2 illustrates a more detailed block diagram of some components of an example of an accelerator 202. Accelerator 202 can be, for example, an implementation of accelerator 102. Accelerator 202 may include a crossbar 210 and a memory 250. Memory 250 (e.g., state buffer memory) can be organized into row groups including row groups 252-0 to 252-7. Each row group contains multiple row partitions. For example, memory 250 may include 128 row partitions that are organized into 16 row groups each containing 8 row partitions. The number of row partitions in memory 250 may correspond to the number of rows in a PE array that loads data from memory 150, and the number of row groups in memory 250 may correspond to the number of output ports of crossbar 210 that writes data into memory 250.

Crossbar 210 may include an internal transpose memory 220, multiple output ports including output ports 230-0 to 230-7, and control logic 240. Transpose memory 220 is used to temporarily store data in crossbar 210 before the data is written to memory 250. In some implementations, transpose memory 220 can be a dedicated memory (or a dedicated portion of a memory) in crossbar 210 that is used only for transpose operations, and crossbar 210 may include another memory (or another portion of a memory) that is used when transferring normal or non-transpose data. Transpose memory 220 can also be a multimode memory that can be used for both transpose write and normal write operations.

Transpose memory 220 can be arranged in rows and columns. The number of rows in transpose memory 220 may correspond to the number of output ports in crossbar 210 that are coupled to memory 250. The width of a row may correspond to the maximum size of a write transaction. For example, if the maximum size of an individual write transaction is 256 bytes, each row in transpose memory 220 can be 256 bytes wide. The number of columns in transpose memory 220 may also correspond to the number of output ports coupled to memory 250. In some implementations, crossbar 210 may include 16 output ports coupled to memory 250. Hence, transpose memory 220 may include 16 rows and 16 columns, and each column can be 16 bytes wide. Crossbar 210 may also include multiple instances of transpose memory 220. For example, to implement a transpose memory for a 128×128 data array of 2-byte elements, 8 instances of transpose memory 220 can implemented in crossbar 210 to provide 128 rows of 256 bytes. Each instance of transpose memory 220 can be coupled to the same 16 output ports to write to memory 250. In other implementations, transpose memory can have a different size or shape, and crossbar 210 may include a different number of output ports coupled to memory 250. For data arrays that are larger than the memory in crossbar 210 allocated for transpose operations, the data array can be split into smaller data arrays, and the data array can be transposed via multiple transpose operations in crossbar 210.

Each output port can be associated with a corresponding row group in memory 250 such that an output port is responsible for writing data into the row partitions of the row group. For example, output port 230-0 can be coupled to row group 252-0 such that the row partitions within row group 252-0 are written by output port 230-0. In some implementations, each row group may include 8 row partitions, and each output port can be responsible for writing data into 8 row partitions of a corresponding row group.

Control logic 240 can be used to orchestrate transpose write operations in crossbar 210. For example, control logic 240 can parse incoming write transactions to determine an opcode associated with the write transaction. The opcode can be used to determine whether the write transaction contains write data for a transpose write operation or for a normal write operation. For transpose write operations, control logic 240 can write incoming data into the transpose memory 220 in a diagonal manner, and to rotate the data when the data is read out from the transpose memory 220. Control logic 240 can also use the opcode to implement flow control to determine whether a data source has finished sending data for a transpose write operation, and whether the data array being transposed has been completely written into the transpose memory 220 such that the data array can be read out in a transposed format for writing to the target memory.

Figure 3:
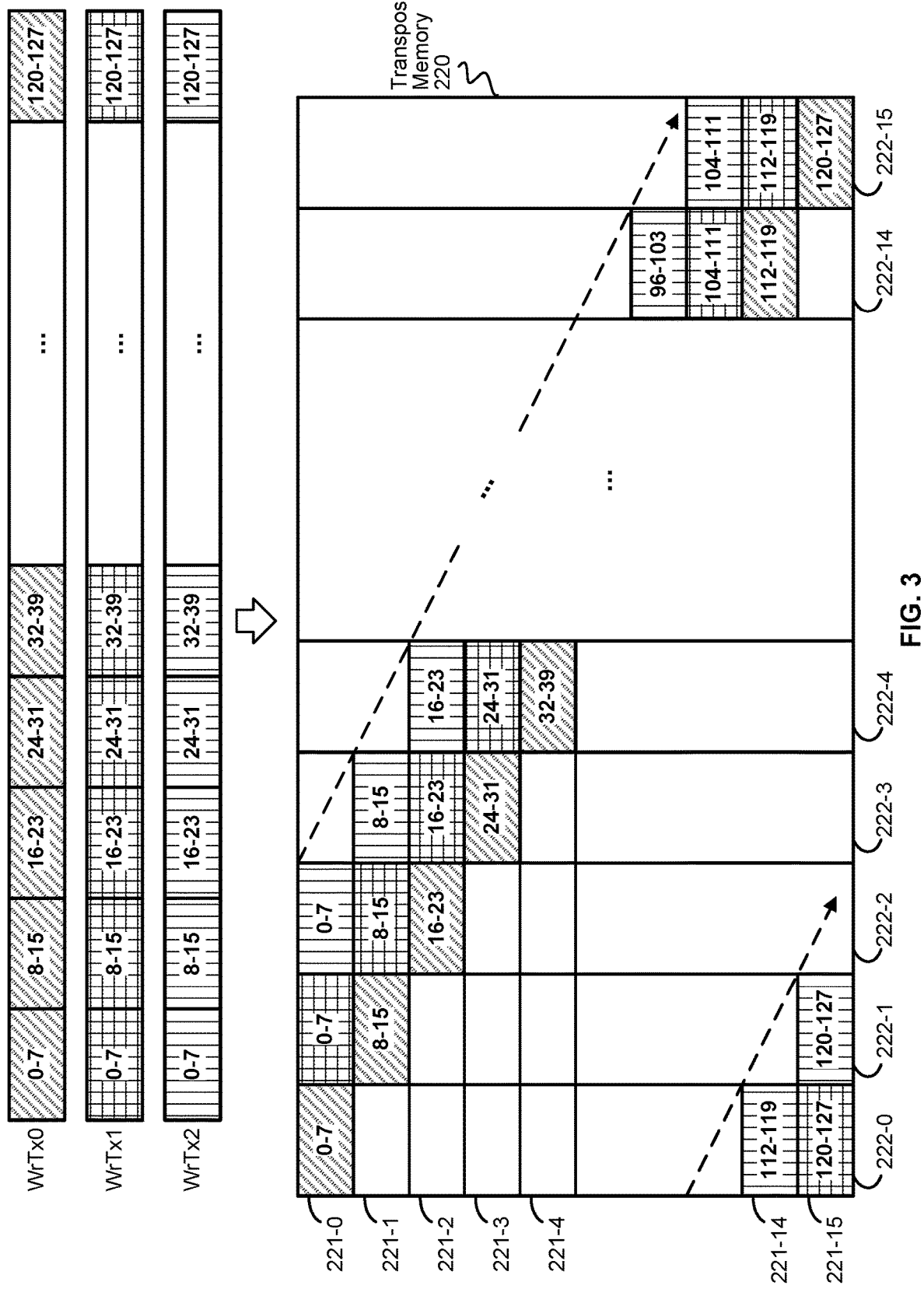
FIG. 3 illustrates a conceptual diagram of an example of storing data in a transpose memory.

FIG. 3 illustrates a conceptual diagram of an example of storing write data for a transpose write in the transpose memory 220 of crossbar 210. In the example shown, three write transactions WrTx0, WrTx1, and WrTx2 have been issued to the crossbar, and each write transaction may include 256 bytes of data. If the data being transferred are two-byte data elements (e.g., FP16 or BF16 data elements), then each write transaction contains 128 data elements, as indicated by the numeric indices in the write transaction.

For a normal write operation, each write transaction may correspond to a row of data being written to a row of the target memory. For a transpose write operation, each write transaction may correspond to a row of the source data array, but the data elements of the write transaction are written to different rows of the target memory. The target memory can be, for example, memory 250. To achieve the transpose write operation, the write data of each write transaction of a transpose write is stored diagonally in transpose memory 220.

As discussed above, transpose memory 220 may include 16 rows 221-0 to 221-15, and 16 columns 222-0 to 222-15, with each column being 16 bytes wide. To store the write data of a write transaction diagonally in transpose memory 220, the write data is distributed across different rows and different columns. Referring to the first write transaction WrTx0 with the write data shown in the diagonal fill pattern, data elements 0-7 (totaling 16 bytes) are stored in the first row 221-0 of the first column 222-0, data elements 8-15 are store in the second row 221-1 of the second column 222-1, data elements 16-23 are store in the third row 221-2 of the third column 222-2, and so on. For the second write transaction WrTx1 with the write data shown in the square fill pattern, data elements 0-7 are stored in the first row 221-0 of the second column 222-1, data elements 8-15 are store in the second row 221-1 of the third column 222-2, data elements 16-23 are store in the third row 222-2 of the fourth column 222-3, and so on. Data elements 120-127 of write transaction WrTx1 are wrapped around and stored in the last row 221-15 of the first column 222-0. For the third write transaction WrTx2 with the write data shown in the vertical fill pattern, data elements 0-7 are stored in the first row 221-0 of the third column 222-2, data elements 8-15 are store in the second row 221-1 of the fourth column 222-3, data elements 16-23 are store in the third row 221-2 of the fifth column 222-4, and so on. Data elements 112-119 and data elements 120-127 of write transaction WrTx2 are wrapped around and stored in the fifteenth row 221-14 of the first column 222-0 and the last row 221-15 of the second column 222-1, respectively. In this manner, sixteen write transactions of 256 bytes can fill transpose memory 220.

Figure 4:
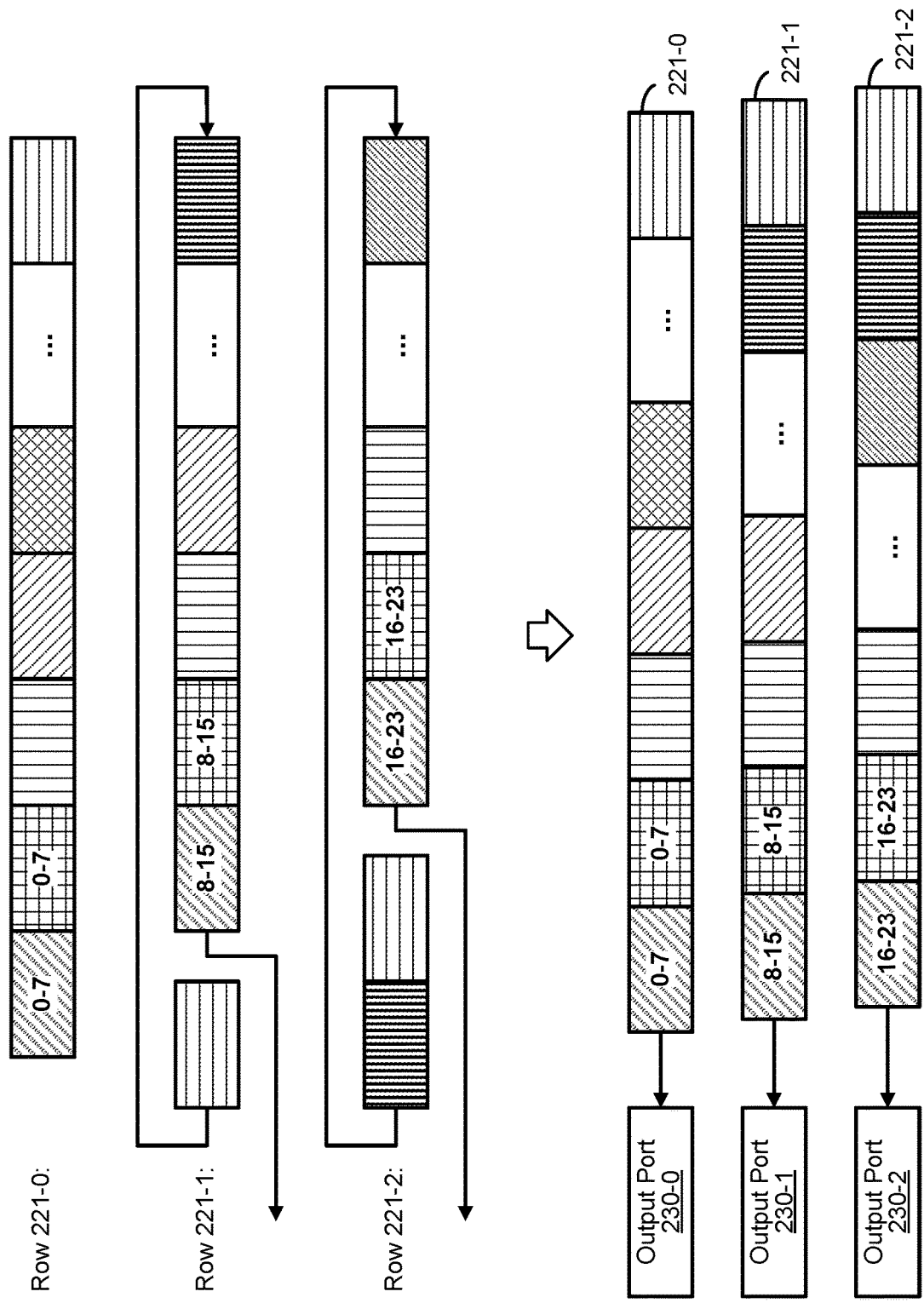
FIG. 4 illustrates a conceptual diagram of an example of rotating data in a transpose memory.

Referring to FIG. 4, after storing the write data for a data array diagonally in transpose memory 220, each row of data in transpose memory 220 is rotated before providing the data to an output port. The amount of data being rotated is determined by the row index of the row. For example, the amount of data to rotate can be determined as the row index multiplied by the column width. Hence, the row of data in the first row 221-0 can be rotated by 0 bytes, the row of data in the second row 221-1 can be rotated by 16 bytes, the row of data in the second row 221-2 can be rotated by 32 bytes, and so on. The data rotation has the effect of aligning the data from each write transaction along the column direction as shown in FIG. 4. For example, after rotation, the data with the diagonal fill pattern from the first write transaction WrTx0 are aligned along the first column; the data with the square fill pattern from the second write transaction WrTx1 are aligned along the second column; the data with the square fill pattern from the third write transaction WrTx2 are aligned along the third column, and so on. The rotated data from each row of the transpose memory can then be provided to a corresponding output port to write to the target memory. For example, the rotated data from row 221-0 is provided to output port 230-0; the rotated data from row 221-1 is provided to output port 230-1; the rotated data from row 221-2 is provided to output port 230-2, and so on.

Although the data from each row of the data array being written to the target memory is aligned in the column direction, each output port may still need to distribute the individual data elements to different row partitions of the target memory, because each output port is coupled to a row group having multiple partitions. Each output port may implement an output buffer (or output FIFO) to rearrange the data received from a row of transpose memory 220 to distribute the data to multiple row partitions. For example, the rotated data from a row of the transpose memory 220 can be stored diagonally in the output buffer. Each row of buffer data in the output buffer can be rotated, and the rotated buffer data from each row of the output buffer can be written to a corresponding row partition of the target memory.

Figure 5:
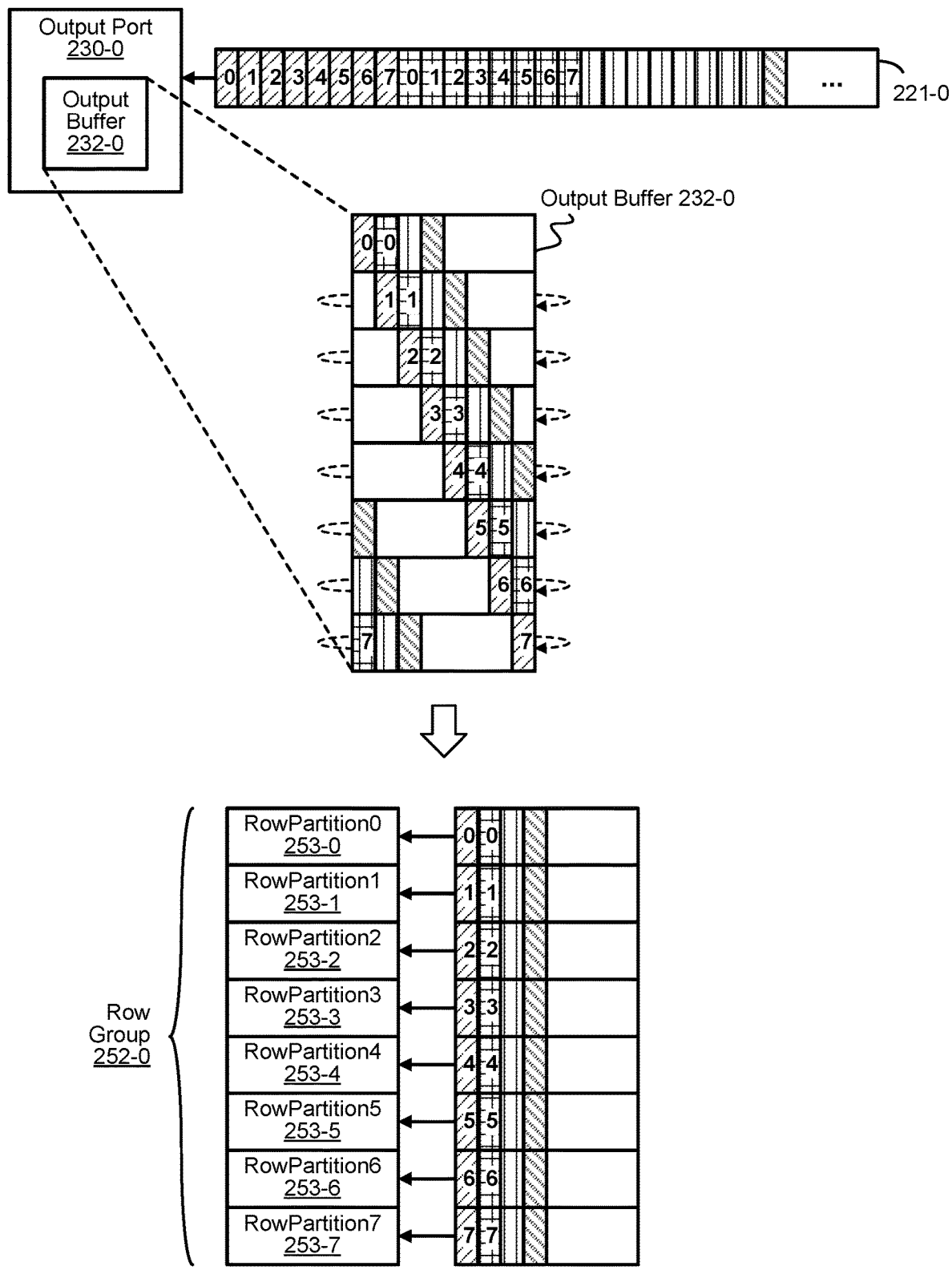
FIG. 5 illustrates a conceptual diagram of an example of storing and rotating data in an output buffer.

Referring now to FIG. 5, as described above, the data provided to output port 230-0 can include data elements 0-7 of the first write transaction WrTx0; data elements 0-7 of the second write transaction WrTx1, and so on. Output port 230-0 can implement an output buffer 232-0 having eight columns that are one data element wide. The data received by output port 230-0 can be stored diagonally in output buffer 232-0 as shown, in which each sequential data element is stored in the next row of the next column (which may wrap around the output buffer 232-0). The buffer data stored in each row of output buffer 232-0 is then rotated to align the data elements of each write transaction having same index along column direction. The amount of data elements being rotated in each row is based on the row index. For example, the first row of output buffer 232-0 is rotated by zero data elements; the second row of output buffer 232-0 is rotated by one data element; the third row of output buffer 232-0 is rotated by two data elements; etc.

The rotated buffer data from each row of the output buffer of an output port can then be written into a corresponding row partition belonging to the row group of the target memory coupled to the output port. For example, the rotated buffer data from the first row of output buffer 232-0 can be written to RowPartition0 253-0 of row group 252-0; the rotated buffer data from the second row of output buffer 232-0 can be written to RowPartition1 253-1 of row group 252-0; and so on. Hence, by storing the write data in a diagonal manner and rotating the data, a data array can be written into the target memory in a transposed orientation. The data from transpose memory 220 can be rearranged in the output buffer of each of the output ports 230-0 to 230-7 in a similar manner. Storing the data diagonally and rotating each row of data in the transpose memory and output buffer can be implemented using wire interconnects and multiplexors, and thus the transposition performed in crossbar does not incur excessive clock cycles or latencies.

In the examples described above, the transpose memory, output buffer, and target memory (e.g., state buffer memory) have been described as having certain number of rows, columns, and/or column width. It should be understood that in other implementations, these components may have a different number of rows, columns, and/or column width. The maximum amount of data that can be transferred in a write transaction can also be different from the examples described above. In some implementations, the data element size of the data array being transposed can also vary. For example, instead of transferring 2-byte data elements such as FP16 or BF16, the data elements can be 4-byte data elements such as 32-bit floating-point (FP32) numbers. In some implementations, the transpose memory and output buffer of the crossbar can support data types of different widths, and the crossbar can switch between performing transpose writes of data arrays with 2-byte data elements, and performing transpose writes of data arrays of 4-byte data elements, as well as normal (non-transpose) writes of such data types.

It should also be noted that in some implementations, the row partitions in the target memory (e.g., state buffer memory) may not be in sequential order. For example, to support tiling for concurrent matrix multiplications in the PE array, the row partitions of the target memory can be arranged such that the first row group may include row partitions 1-4 and 32-35, the second row group may include row partitions 64-67 and 96-99. In such scenarios, prior to storing the data of a write transaction diagonally in the transpose memory, a shuffle operation can be applied to the data elements of the write transaction to map the data elements to the correct output port.

Continuing with transpose memory 220 described above, transpose memory 220 can be filled by 16 write transactions of 256 bytes. The write transactions can be sent by different data sources. For example, a single DMA engine may send all 16 write transactions to the crossbar, two DMA engines may send 8 write transactions each, or one DMA engine may send 10 write transactions and another DMA engine may send 6 write transactions. Each write transaction can also be sent by a different DMA engine. Crossbar 210 can receive and process write transactions in parallel from any number of data sources.

To enable crossbar 210 to recognize write transactions that are intended for transpose writes, certain portions of the address field of the write transactions can be overloaded to provide transpose information. When a write transaction is routed to the crossbar, certain address bits may have already been decoded to indicate that the write transaction should be routed to the crossbar for writing to the target memory. As such, some address bits that are no longer needed, and can be repurposed to carry transpose information. For DMA transactions, the address can be included as part of the memory descriptor.

Figure 6:
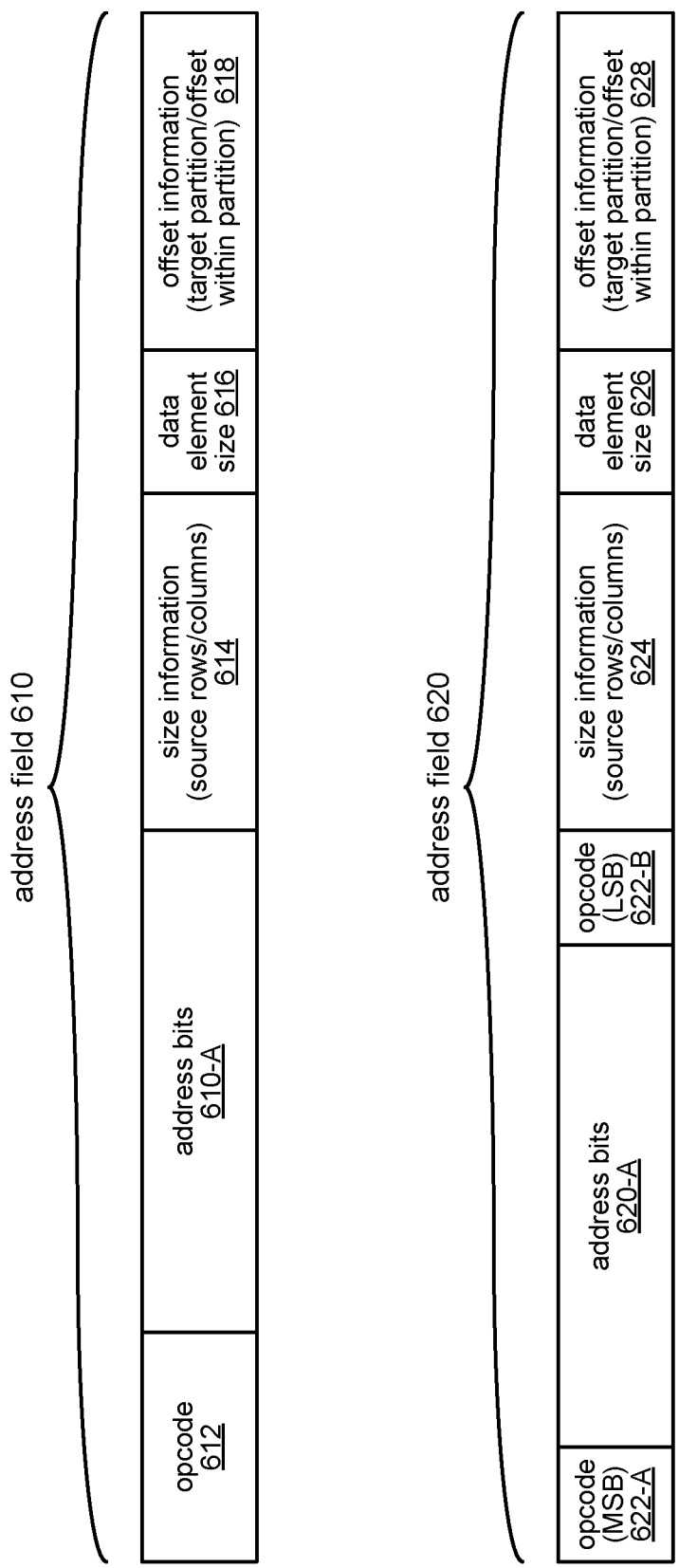
FIG. 6 illustrates examples of an address field in a write transaction.

FIG. 6 illustrates examples of an address field of a write transaction. As mentioned above, certain address bits can be repurposed to carry attributes that are used for transpose operations. The set of attributes used for transpose writes may include an opcode, size information of the data array being transposed, offset information for the target memory, and data element size of the data elements of the data array. By way of example, an address field 610 for a write transaction can have certain number of most-significant bits and least-significant bits that are not needed for writing data into the target memory. In the example shown, the least-significant bits of address filed 610 are repurposed to provide size information 614 of the data array being transposed (e.g., may include the number of source rows and columns), data element size 616 of the data elements in the data array (e.g., may indicate 2-bytes for FP16 or BF16, or 4-bytes for FP32), and offset information 618 when writing the transpose data array into the target memory (e.g., may include the starting partition in the target memory and an offset within the starting partition). The most-significant bits of address filed 610 are repurposed to provide an opcode 612, which can be used to indicate whether the write transaction is part of a transpose write operation. The middle address bits 610-A are retained for addressing locations in the target memory.

In some implementations, the address bits being overloaded need not be contiguous, and certain attributes can be split across non-contiguous bits of the address field. This can be done, for example, if the middle address bits used for addressing locations in the target memory do not align with the size of the transpose attributes. For example, referring to address field 620, the opcode can be split into an opcode most-significant bit(s) (MSB) 622-A, and an opcode least-significant bit(s) (LSB) 622-B. The opcode MSB can be provided in the upper bit(s) of the address field 620, and the opcode LSB can be provided in the lower bits of the address field 620 after the retained address bits 620-A. It should also be noted that the other attributes (e.g., size information 624, data element size 626, and offset information 628) can also be split up, and that the attributes can be provided in the address field 620 at other positions and/or in a different order. A more detailed escribe of the various transpose attributes will now be described.

The size information of the data array may include a source rows field indicating the number of rows of the data array being transposed, and a source columns field indicating the number of columns of the data array being transposed. The size information has an upper bound based on the size of the transpose memory, and the data element size of the data elements in the data array being transposed. Some data arrays may not fully fill the transpose memory. The size information of the data array can be used for flow control to determine when all data elements of the data array have been written into the transpose memory.

The offset information for the target memory may include the starting partition to store the transposed data in the target memory, and an offset within the partition indicating where the write data of particular write transaction is placed in the target memory. The offset can also be used to determine which starting column in the transpose memory that the write data of the write transaction is written to. The write data is written diagonally in the transpose memory, and the offset can indicate which column in the transpose memory that the write data starts at.

The opcode can be used to indicate that the write transaction is part of a transpose write operation. For non-transpose operations, the opcode can be set to a default value. For transpose operations, the opcode can carry control information for the transpose memory. For example, the opcode can be set to respective values representing various transpose commands including "spray," "spray-last," "nop" (no operation), "spray-last-with-nop," and "flush."

As mentioned above, the write transactions for a transpose write can come from any number of data sources. To allow the transpose memory to track whether a data source (e.g., DMA engine) has finished posting write transactions involved in a transpose write, the opcode can be set to the spray-last command when the write transaction is either the last write transition from the data source for the transpose write, or is the only write transaction (hence the last write transaction) from the data source for the transpose write. The opcode can be set to a value representing the "spray" command when a data source has more than one write transaction to issue for the transpose write, and the write transaction is not the last write transaction from the data source.

To implement flow control, when an input port coupled to the transpose memory receives a write transaction with a "spray-last" opcode, the transpose credit for the input port is decremented. Write transactions having a "spray" opcode will not consume any transpose credit. Hence, the transpose credit is consumed when the last write transaction from a data source is received. The transpose credit is returned when all the rows of the transpose memory are read out of the crossbar, which happens when all input ports have delivered their write transactions. If an input port runs out of transpose credits, the input port will stop consuming any write transactions. The transpose memory can be made aware of when the write data for a transpose operation have been completely received by monitoring the number of write transactions as compared to the source rows indicated in the size information of the source data array. For example, the crossbar can track the number of write transaction issued to the transpose memory, and when that count reaches the number of source rows, the write data is ready to be sent to the target memory. At that point, the crossbar can schedule a read of each row in the transpose memory to the corresponding output port.

In some implementations, the transpose memory can process sequential transpose operations in a pipeline fashion to achieve close to full data transfer bandwidth when the same set of data sources (e.g., same set of DMA engines) are performing the transpose write operations. When the set of data sources changes between transpose operations, a write transaction with a flush command is issued to flush the transpose memory.

Transpose write transactions are acknowledged at the input of the crossbar. This is because there is no simple one-to-one mapping of writes in the target memory to the original write transactions from the data sources. In order to notify the consumer of the transposed data (e.g., a compute engine) that the data is ready in the target memory for consumption, a mechanism to guarantee that the data is ready for consumption can be implemented with the flush command.

A write transaction with a "flush" opcode can be received at an input port of the crossbar after all write transactions carrying data for the transpose write have been issued. In response to the flush command. The acknowledgments of these writes to the target memory can be aggregated and sent back to the data source as an aggregated acknowledgement. Once the data source received the aggregated acknowledgement, the data source can write or update a semaphore to trigger the consumption of the transposed data in the target memory. Each data source participating in the transposer write operation may issue a write transaction with a flush command and perform the semaphore update.

In some scenarios, a transpose write operation may not fill the entirety of the transpose memory. For example, if the source data array has only seven rows, some of the data sources may not have any data to write to the transpose memory. In order to keep the data sources synchronized, all data sources participating in a transpose write operation can issue a write transaction even when a particular data source has no data to write. For such dummy write transactions, a write transaction with a no operation ("nop") opcode can be issued. A write transaction with a "nop" opcode will decrement the transpose credit at the input port similar to a "spray-last" opcode, but will not be expected to carry any data. The crossbar can implement two counters for each instance of the transpose memory: one counter for actual rows carrying writ data, and one counter for the nops. When both counters reach the respective source rows field, the write transactions to the transpose memory for the transpose write operation is complete. For the data sources with actual data to write, the last write transaction can have the opcode set to the "spray-last-with-nop" opcode to indicate that there are "nop" write transactions in the transpose operation.

Figure 7A:
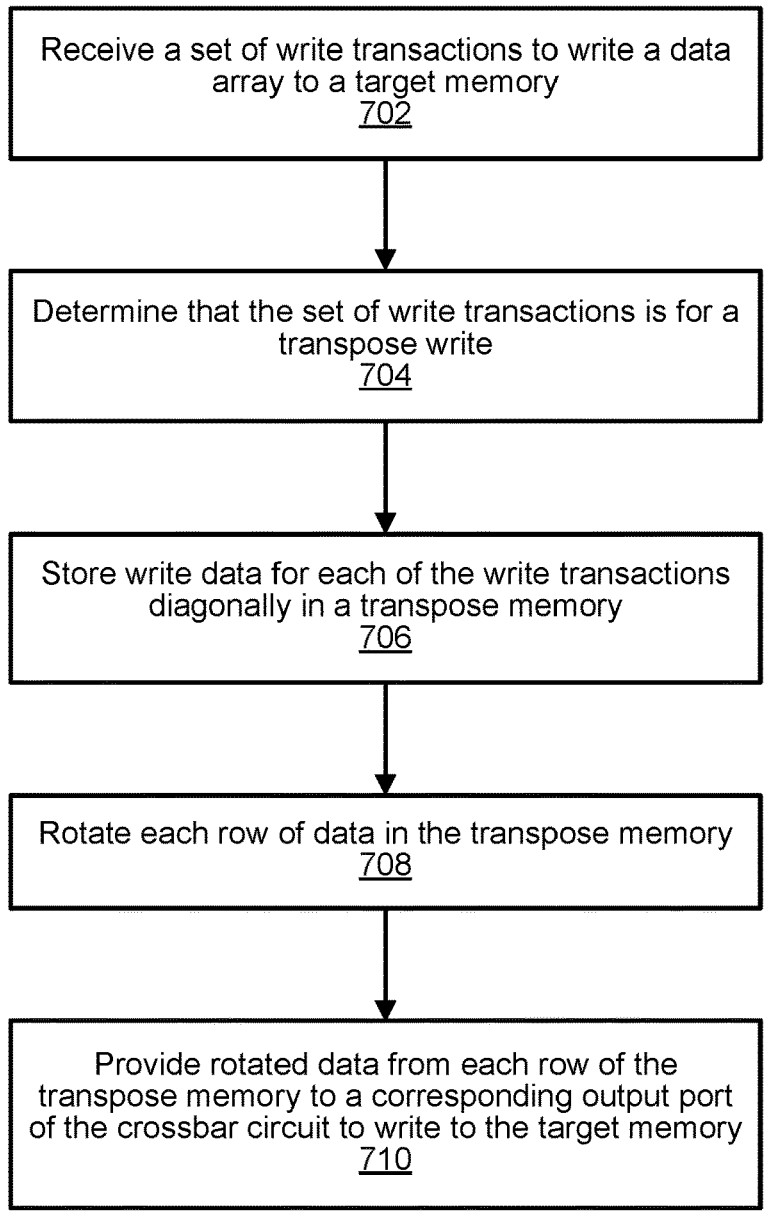
FIG. 7A illustrates a flow diagram of an example of a process for performing a transpose operation in a crossbar circuit.

FIG. 7A illustrates a flow diagram of an example of a process 700 that can be performed, for example, by an integrated circuit device to transpose a data array. The integrated circuit device can be, for example, an accelerator such as a neural network accelerator. The integrated circuit device may include a crossbar circuit coupled to a memory (also referred to as the target memory). The target memory can be a state buffer memory, and may include row partitions organized into row groups. The crossbar circuit can be coupled to one or more data sources that can write to the target memory. For example, the data sources may include one or more DMA engines. The crossbar circuit may include multiple output ports coupled to the target memory, and one or more instances of a transpose memory arranged in rows and columns. Each row of the transpose memory can be coupled to a corresponding output port. Each output port can be coupled to a row group of the target memory.

Process 700 may begin at block 702 by receiving, at the crossbar circuit, a set of write transactions to write a data array to the target memory. The set of write transactions can be issued by any number of data sources, such as one or more DMA engines. In some implementations, the set of write transactions can be received via an interconnect fabric. The write transactions may each include attributes containing transpose control information. In some implementations, the address filed or a write transaction may include one or more portions that are overloaded or repurposed to carry at least some of the attributes containing transpose control information. For a DMA transaction, the address field can be provided as part of the memory descriptor.

At block 704, the crossbar may determine that the set of write transactions is for a transpose write. For example, the address field (or another field) of each write transaction may include an opcode that can be used to indicate whether the write transaction is part of a transpose write. The opcode may have a default value for non-transpose operations. For transpose writes, the opcode can be set to various values representing respective transpose commands. For example, the opcode can be set to a spray command when a data source has more than one write transaction to issue for the transpose write, and the write transaction is not the last write transaction from the data source. The opcode can be set to a spray-last command when the write transaction is either the last write transition from a data source for the transpose write, or is the only write transaction from the data source for the transpose write. When the data array fills only a subset of the rows in the transpose memory, the set of write transactions may further include one or more write transactions that each has the opcode set to a no-operation ("nop") with no data to write.

At block 706, the write data for each of the write transactions can be stored diagonally in the transpose memory of the crossbar circuit. In some implementations, the transpose control information (e.g., provided in the address field) may include size information of the data array being transposed, offset information for the target memory, and/or a data element size indicating the size of the data element in the data array. The size information of the data array and the data element size can be used to track when the write data of all write transactions of the transpose write have been written into the transpose memory. The offset information and the data element size can be used to indicate which starting column in the transpose memory to start storing the write data of a write transaction.

At block 708, each row of data in the transpose memory can be rotated. The amount of data to rotate in each row is determined based on the row index of the row in the transpose memory. For example, the amount of data to rotate can be determined by multiplying the row index by the column width. The effect of the data rotation is to align the write data from the same write transaction in the column direction of the transpose memory.

At block 710, the rotated data from each row of the transpose memory can be provided to a corresponding output port of the crossbar circuit to write to the target memory. In some implementations, each output port may include an output buffer. The output buffer may store the rotated data from a row of the transpose memory diagonally in the output buffer, rotate each row of buffer data in the output buffer, and write the rotated buffer data from each row of the output buffer to a corresponding row partition of the target memory.

Figure 7B:
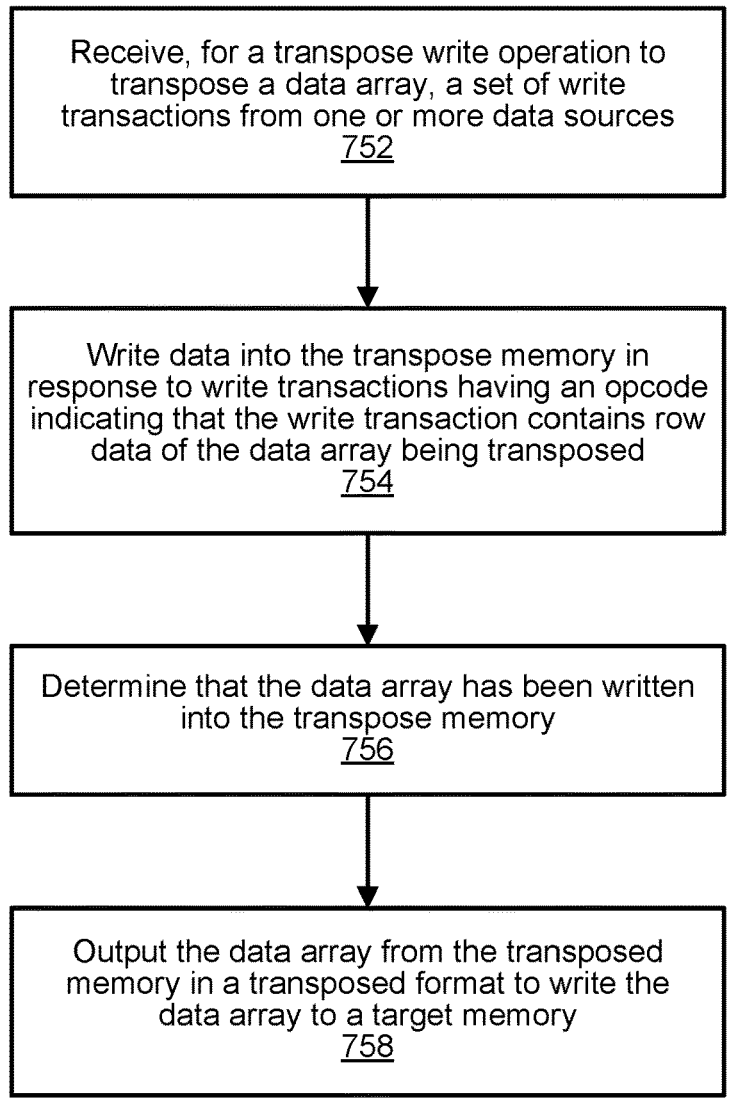
FIG. 7B illustrates a flow diagram of an example of a process for flow control of a transpose operation.

FIG. 7B illustrates a flow diagram of an example of a process 750 that can be performed by control logic of an integrated circuit device to implement flow control for transposing a data array using a transpose memory. The integrated circuit device can be, for example, an accelerator such as a neural network accelerator. The integrated circuit device may include a crossbar circuit that the control logic configures and control. The crossbar circuit can be coupled to a memory (also referred to as a target memory) such as a state buffer memory of the accelerator. The crossbar circuit can be coupled to one or more data sources that can write to the target memory. For example, the data sources may include one or more DMA engines. In some implementations, the crossbar circuit may include multiple instances of the transpose memory that can each transpose a corresponding data array in a pipeline or parallel manner.

Process 750 may begin at block 752 by receiving a set of write transactions from one or more data sources (e.g., DMA engines). The set of write transactions (e.g., DMA write transactions) are issued by the one or more data sources to perform a transpose write operation to transpose a data array using a transpose memory. Each write transaction can include an opcode that can be decoded by the control logic to perform flow control of the transpose write operation. Each write transaction may also include a row size of the data array being transposed, and/or other attributes for the transpose write operation described herein. The control logic can implement a credit mechanism to control when the data sources can write to the transpose memory. Initially, a credit can be granted to each of the one or more data sources for writing to a transpose memory. For implementations with multiple instances of the transpose memory, each of the one or more data sources is granted a credit for each of the multiple transpose memories to write to the corresponding transpose memory.

At block 754, write data is written into the transpose memory in response to write transactions having an opcode indicating that the write transaction contains row data of the data array being transposed. The data can be written, for example, in a diagonal manner into the transpose memory. In some implementations, a "spray" opcode provided in the write transaction can be used to indicate that the write transaction contains row data of the data array being transposed. A "spray-last" opcode (or a "spray-last-with-nop" opcode when the data array does not fill all rows of the transpose memory) can also be used to indicate that the write transaction contains row data of the data array being transposed.

A "spray-last" or a "spray-last-with-nop" opcode indicates that the write transaction is the last write transaction from the data source for the transpose write operation. In response to receiving a write transaction with one of these opcodes, the credit of the data source that issued the write transaction can be decremented. A write transaction with a "nop" opcode can also result in the credit of the data source that issued the write transaction to be decremented. The "nop" opcode can be used by one or more of the data sources to indicate that the data source has no data to write for this transpose write operation.

At block 756, a determination can be made that writing of the data array into the transpose memory has completed. For example, the control logic can maintain a counter to count the number of write transactions containing row data for the data array being transposed. When the counter reaches the row size provided in the write transactions (to indicate that the row size number of write transactions have been received), the control logic can determine that the entire data array has been written into the transpose memory.

For data arrays that have fewer rows than the transpose memory, in addition to counting write transaction containing row data from the data array, a counter that counts write transactions with the "nop" opcode can also be implemented. The write transactions with the "nop" opcode also include a row size field indicating the number of "nop" write transactions being expected, which corresponds to the number of data sources have no data to write for the transpose operation. When the counters indicated that the expected number of write transactions containing row data and the expected number of "nop" write transactions have been received, the control logic can be determined that the data array stored in the transpose memory is ready to be read out. For scenarios in which one or more data sources have no data to write, a "spray-last-with-nop" opcode can be used for the last write transaction containing actual data being sent by the data source for the transpose write operation. This indicates to the control logic that the last write transaction in the set of write transactions for the transpose write operation can be a "nop" write transaction.

At block 758, the data array from the transposed memory can be outputted in a transposed format to write the data array to the target memory. Upon outputting the data array, the credit for each of the one or more data sources is returned to allow the data sources to write data to the transpose memory for the next transpose write operation. In some implementations, when all write transactions for a transpose write have been issued to the crossbar circuit, a flush transaction (e.g., a write transaction with the opcode set to "flush") can be received after the set of write transactions. In response to the flush transaction, a write with no data (e.g., a dummy write) can be broadcasted to the target memory on each of the output ports. When the target memory sends back an acknowledgement for each of the writes, the acknowledgements can be aggregated into an aggregated acknowledgement, and the aggregated acknowledgement is sent to the data source of the data array to indicate completion of the transpose write. The aggregated acknowledgement can trigger the data source to update a semaphore to indicate completion of the transpose write. The semaphore update can indicate to a consumer of the data that the transposed data array is ready to be accessed. The consumer can be, for example, a compute engine that performs computations on the transposed data array. In some implementations, each of the data sources can issue a flush transaction and update a semaphore to indicate completion of the transpose write operation.

FIG. 7C illustrates a table 780 containing examples of opcodes 782 for write transactions, and whether the opcode results in data being written to the transpose memory 784 and/or results in credit for the data source to be decremented 786. A write transaction having the "spray" opcode will write data into the transpose memory but not decrement the credit for the data source. A write transaction having the "spray-last" opcode or "spray-last-with-nop" opcode will write data into the transpose memory, and also decrement the credit for the data source. A write transaction having the "nop" opcode will not write data into the transpose memory, but will decrement the credit for the data source. A write transaction may include other opcodes not specifically listed in table 780. For example, a write transaction having a "flush" opcode will not write any data into the transpose memory, and will not consume any credit.

Figure 8:
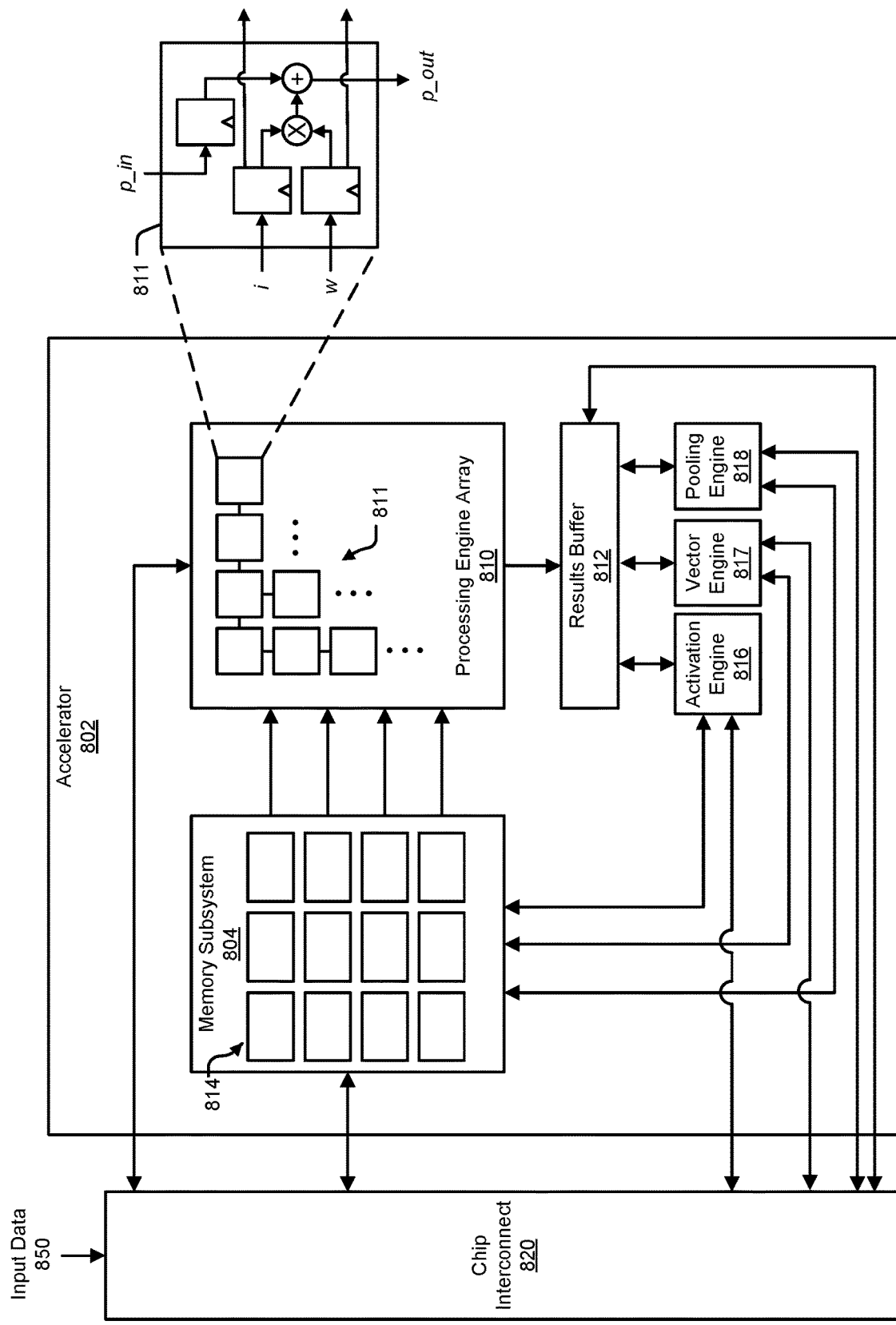
FIG. 8 illustrates a block diagram of an example of an integrated circuit device.

FIG. 8 is a block diagram illustrating an example of an accelerator 802. In various examples, the accelerator 802, for a set of input data (e.g., input data 850), can execute computations using a processing engine array 810, an activation engine 816, a vector engine 817, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. Memory subsystem 804 can also be referred to as a state buffer. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the vector engine 817, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816, the vector engine 817, and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 128 rows, or some other number of columns and/or rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p in, provided either from another processing engine 811 or from a previous round of computation by the processing engine array 810. When starting a computation for a new set of input data, the top row of the processing engine array 810 can receive a fixed value for p in, such as zero. As illustrated by this example, i and w are multiplied together and the result is summed with p in to produce a new partial sum, p out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

In some implementations, the accelerator 802 can further include a vector engine 817. Vector engine 817 is a compute engine that can perform computations and manipulations on values stored in memory subsystem 804 and/or results buffer 812 such as values representing matrices of input values, weight values, intermediate results, etc. Vector engine 817 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 817 can operate in parallel and/or simultaneously. In some examples, the vector engine 817 can be bypassed or be omitted.

Herein, the activation engine 816, the vector engine 817, and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816, the vector engine 817, and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
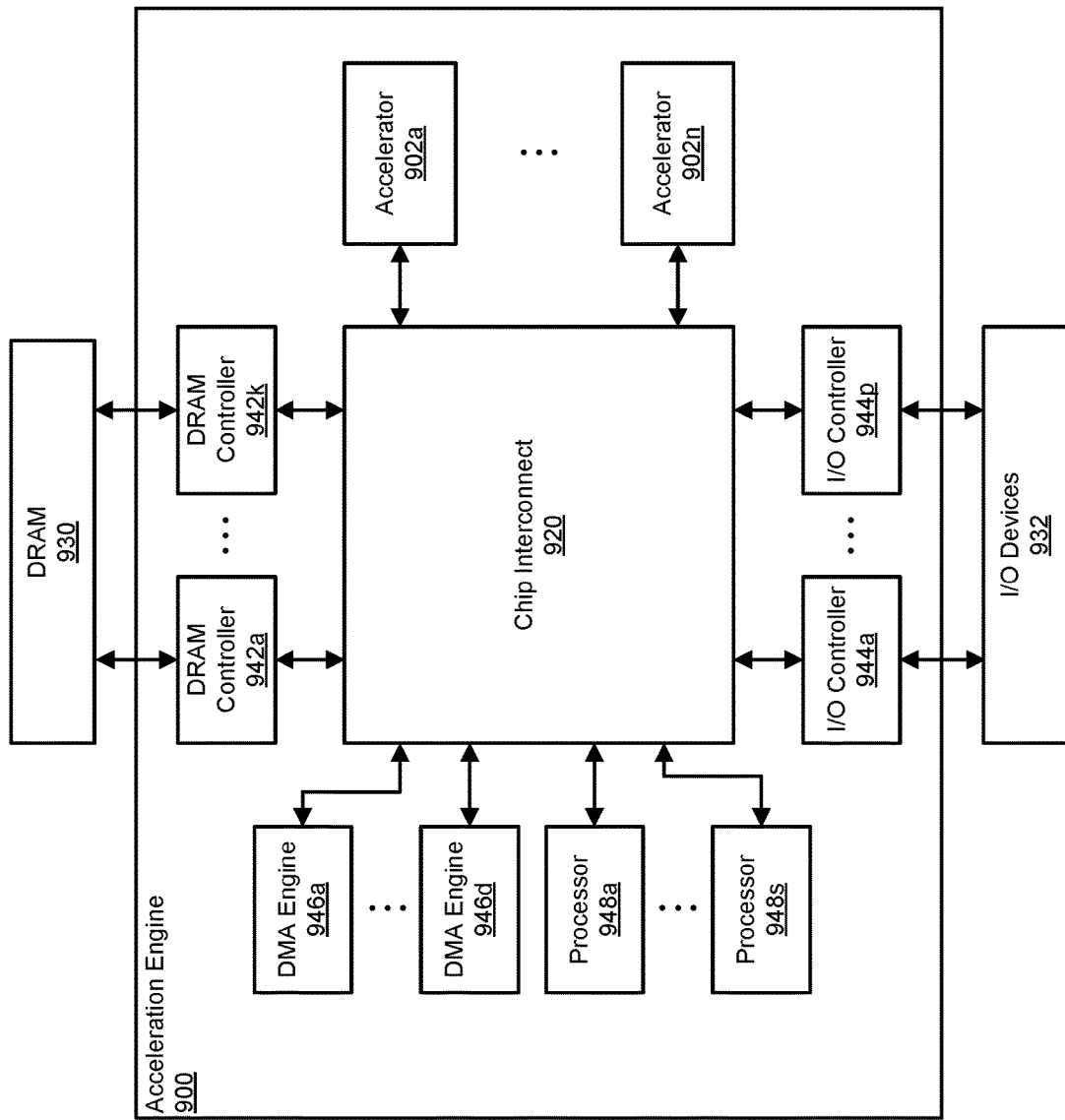
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general-purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
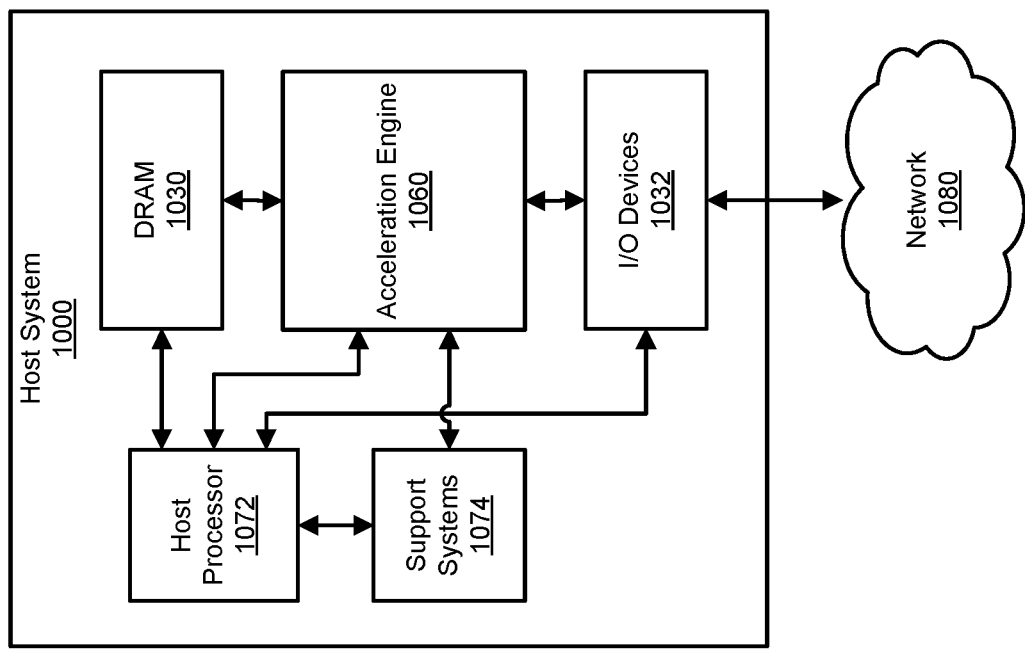
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general-purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A neural network processor comprising:
   one or more direct memory access (DMA) engines;
   a state buffer memory having a plurality of row partitions organized into row groups; and
   a crossbar circuit having a transpose memory coupled to a plurality of output ports, each output port operable to write to a corresponding row group of the state buffer memory,
   wherein the one or more DMA engines are operable to issue a set of write transactions to write a data array to the state buffer memory,
   wherein the crossbar circuit is operable to:
      determine that the set of write transactions is for a transpose write;
      store write data for each write transaction diagonally in the transpose memory;
      rotate each row of data in the transpose memory; and provide rotated data from each row of the transpose memory to a corresponding output port to write to the state buffer memory, and
wherein each of the write transactions in the set of write transactions includes an opcode to provide flow control information to manage transpose credits used for accessing the transpose memory.

2. The neural network processor of claim 1, wherein each output port includes an output buffer, and
wherein the crossbar circuit is further operable to:
store the rotated data from a row of the transpose memory diagonally in the output buffer of an output port;
rotate each row of buffer data in the output buffer; and
write the rotated buffer data from each row of the output buffer to a corresponding row partition of the state buffer memory.

3. The neural network processor of claim 1, wherein each of the write transactions includes a set of attributes including the opcode, size information of the data array, a data element size of the data array, and offset information for the state buffer memory.

4. The neural network processor of claim 3, wherein the set of attributes is provided in an address field of each write transaction.

5. An integrated circuit device comprising:
a target memory; and
a crossbar circuit including:
a transpose memory arranged in rows and columns; and
a plurality of output ports,
wherein each row of the transpose memory is coupled to a corresponding output port,
wherein the crossbar circuit is operable to:
receive a set of write transactions to write a data array to the target memory;
determine that the set of write transactions is for a transpose write; and
transpose the data array being written into the target memory by:
storing write data for each write transaction diagonally in the transpose memory;
rotating each row of data in the transpose memory; and
providing rotated data from each row of the transpose memory to a corresponding output port to write to the target memory, and
wherein each of the write transactions in the set of write transactions includes an opcode to provide flow control information to manage transpose credits used for accessing the transpose memory.

6. The integrated circuit device of claim 5, wherein the target memory is organized into row groups each containing a plurality of row partitions, and each output port is operable to write to a corresponding row group.

7. The integrated circuit device of claim 6, wherein an output port of the crossbar circuit includes an output buffer, and the output buffer is operable to:
store the rotated data from a row of the transpose memory diagonally in the output buffer;
rotate each row of buffer data in the output buffer; and
write rotated buffer data from each row of the output buffer to a corresponding row partition of the target memory.

8. The integrated circuit device of claim 5, wherein the opcode differentiates between a transpose write operation and a non-transpose write operation.

9. The integrated circuit device of claim 5, wherein the opcode of a write transaction is provided in an address field of the write transaction.

10. The integrated circuit device of claim 5, wherein the opcode of a write transaction is set to a spray command when a data source has more than one write transaction to issue for the transpose write, and the write transaction is not a last write transaction from the data source.

11. The integrated circuit device of claim 5, wherein the opcode of a write transaction is set to a spray-last command when the write transaction is either a last write transition from a data source for the transpose write, or is an only write transaction from the data source for the transpose write.

12. The integrated circuit device of claim 5, wherein when the data array fills only a subset of rows in the transpose memory, the set of write transactions further includes one or more write transactions that each has the opcode set to a no-operation (nop) with no data to write.

13. The integrated circuit device of claim 5, wherein each of the write transactions includes an address field, and wherein size information of the data array is provided in the address field.

14. The integrated circuit device of claim 13, wherein the size information of the data array includes a row size indicating a number of rows in the data array.

15. The integrated circuit device of claim 5, wherein each of the write transactions includes an address field, and wherein a data element size of the data array is provided in the address field.

16. The integrated circuit device of claim 5, wherein the set of write transactions is issued by one or more direct memory access engines.

17. A method comprising:
receiving, at a crossbar circuit, a set of write transactions to write a data array to a target memory;
determining that the set of write transactions is for a transpose write;
storing write data for each of the write transactions diagonally in a transpose memory of the crossbar circuit;
rotating each row of data in the transpose memory; and
providing rotated data from each row of the transpose memory to a corresponding output port of the crossbar circuit to write to the target memory,
wherein each of the write transactions in the set of write transactions includes an opcode to provide flow control information to manage transpose credits used for accessing the transpose memory.

18. The method of claim 17, wherein the target memory is organized into row groups each containing a plurality of row partitions, and each output port writes to a row group, and
wherein the method further comprises:
storing the rotated data from a row of the transpose memory diagonally in an output buffer of an output port;
rotating each row of buffer data in the output buffer; and
writing rotated buffer data from each row of the output buffer to a corresponding row partition of the target memory.

19. The method of claim 17, wherein each of the write transactions includes a set of attributes including one or more of size information of the data array, a data element size of the data array, and offset information for the target memory.

20. The method of claim 19, wherein the set of attributes is provided in an address field of each write transaction.

* * * * *